United States Patent
Brogger

(10) Patent No.: US 10,016,090 B2
(45) Date of Patent: Jul. 10, 2018

(54) DISPOSABLE GRILL

(71) Applicant: Novo Futura, Espergaerde (DK)

(72) Inventor: Carsten Nygaard Brogger, Esperaerde (DK)

(73) Assignee: NOVO FUTURA IVS, Espergærde (DK)

( * ) Notice: Subject to any disclaimer, the term of this patent is extended or adjusted under 35 U.S.C. 154(b) by 325 days.

(21) Appl. No.: 14/778,732

(22) PCT Filed: Mar. 22, 2013

(86) PCT No.: PCT/DK2013/050081
§ 371 (c)(1),
(2) Date: Sep. 21, 2015

(87) PCT Pub. No.: WO2014/146661
PCT Pub. Date: Sep. 25, 2014

(65) Prior Publication Data
US 2016/0051088 A1 Feb. 25, 2016

(51) Int. Cl.
*A47J 37/07* (2006.01)
(52) U.S. Cl.
CPC ....... *A47J 37/0704* (2013.01); *A47J 37/0768* (2013.01)
(58) Field of Classification Search
CPC .... A47J 37/0704; A47J 37/0768; A47J 37/07; A47J 37/0763; A47J 36/022
See application file for complete search history.

(56) References Cited

U.S. PATENT DOCUMENTS

| | | | |
|---|---|---|---|
| 78 A * | 11/1836 | Sizer | A47J 37/0704 432/189 |
| 3,353,527 A | 11/1967 | Anderson | |
| 4,254,863 A | 3/1981 | Kates | |
| 4,531,506 A * | 7/1985 | Chambers | A47J 37/0768 126/25 R |
| 4,762,525 A * | 8/1988 | Wood | C10L 5/368 126/9 A |
| 4,877,010 A * | 10/1989 | Hait | F24C 1/16 126/39 M |
| 5,535,666 A | 7/1996 | Southerland | |

FOREIGN PATENT DOCUMENTS

| | | |
|---|---|---|
| DE | 10108328 A1 | 8/2002 |
| DE | 202012004383 U1 | 8/2012 |
| EP | 0283420 A1 | 9/1988 |
| GB | 1295891 | 11/1972 |
| JP | 55016690 A | 2/1980 |
| JP | 62014201 U1 | 1/1987 |
| JP | 07232769 A | 9/1995 |
| JP | 2002360447 A | 12/2002 |

OTHER PUBLICATIONS

International Search Report for corresponding application PCT/DK2013/050081 filed Mar. 22, 2013; dated Sep. 19, 2013.

* cited by examiner

*Primary Examiner* — Alfred Basichas
(74) *Attorney, Agent, or Firm* — Cantor Colburn LLP

(57) ABSTRACT

Disposable grill including a base tray having a bottom part and a top opening, the disposable grill further including grate means having a load-carrying structure, where the grate means is adapted to cover at least a part of the top opening, and where the bottom part of the base tray and the load-carrying structure of the grate means are formed by a flammable material.

20 Claims, 3 Drawing Sheets

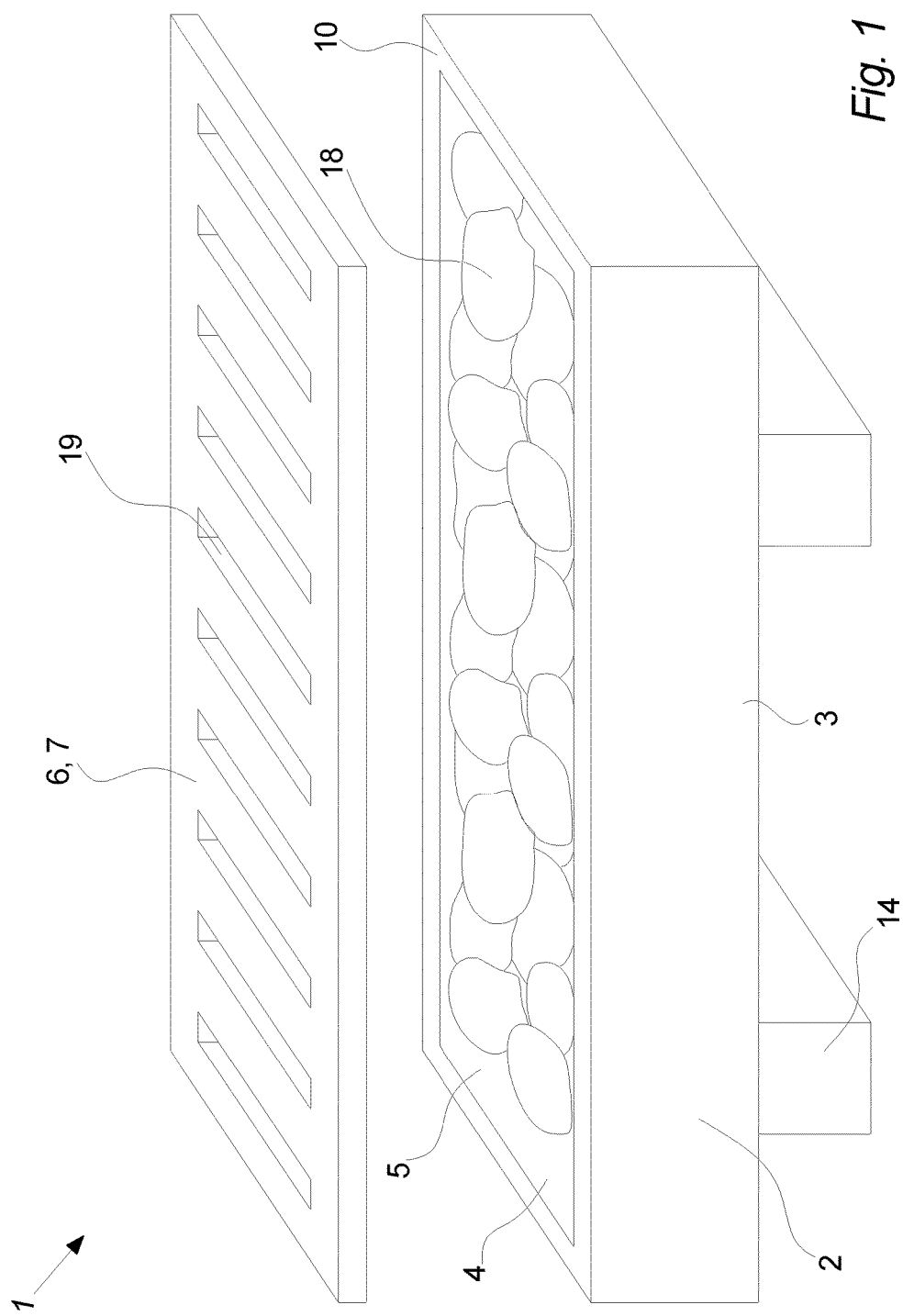

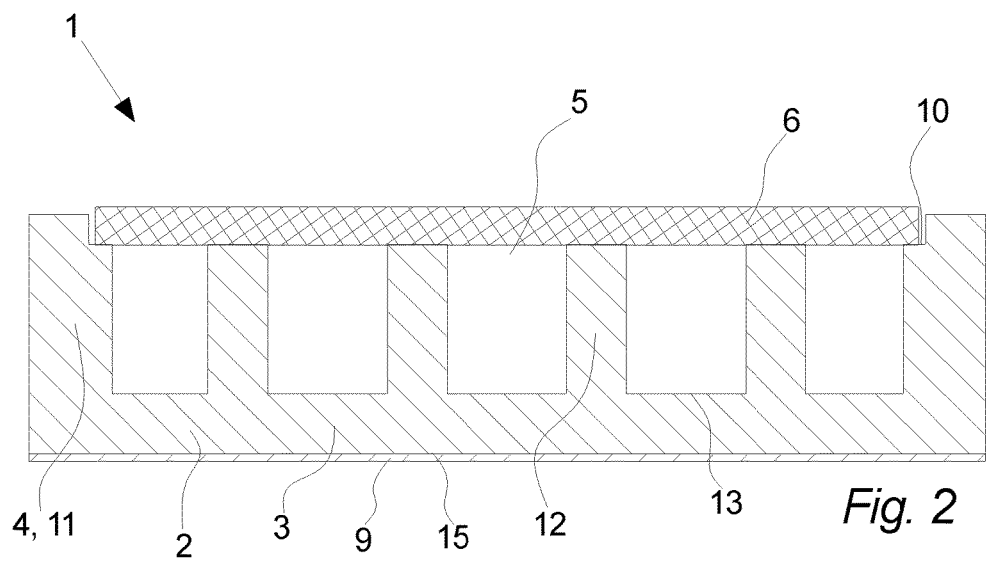
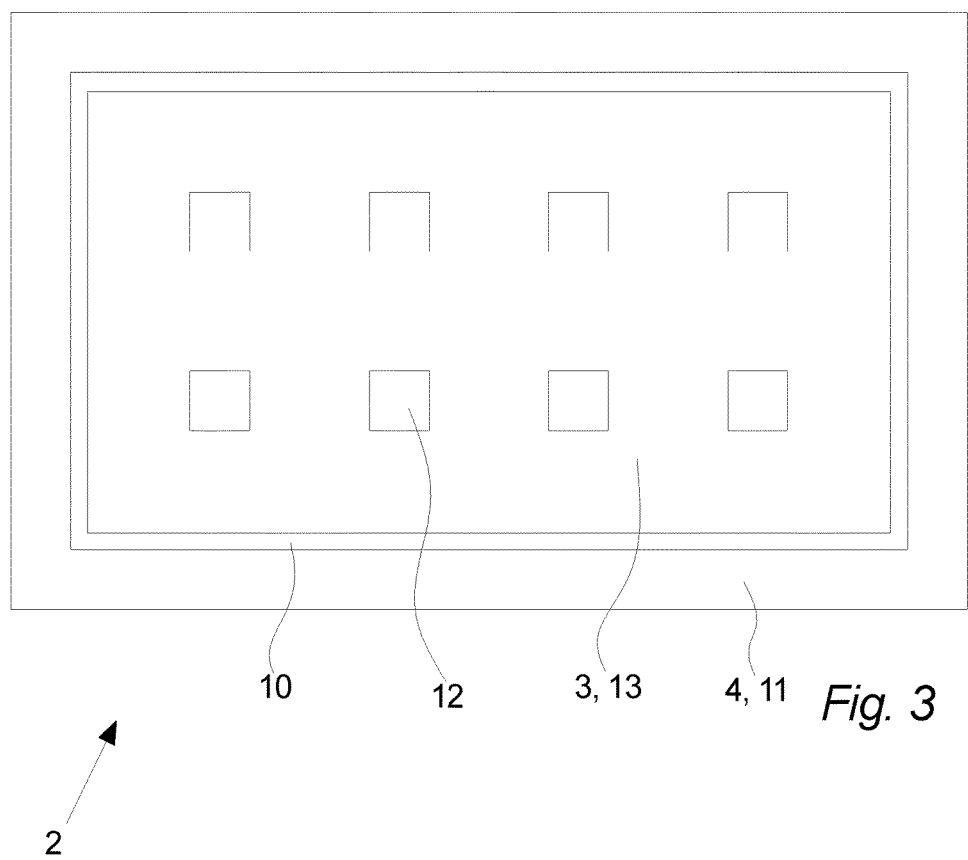

DISPOSABLE GRILL

FIELD OF THE INVENTION

The invention relates to disposable grill comprising a base tray including at least a bottom surface and a top opening. The disposable grill also comprises grate means including a load-carrying structure, wherein the grate means is adapted to cover at least a part of the top opening.

BACKGROUND OF THE INVENTION

Disposable grills have been known in the art for years. Such one-time grills usually comprise a base tray made from thin aluminum plates which is pre-filled with charcoal and covered by a thin metal grate.

Such disposable grills are convenient to use when hiking, on the beach and in outer circumstances where you want to grill without bringing along or investing in a traditional grill.

However, after use the disposable grill is still hot and therefore difficult to dispose of properly. Thus, the disposable grill is often left in the nature where it takes a very long time to decompose.

Thus, from the German utility model DE 20 2012 004 383 U1 it is known to form a disposable grill from plant material to ensure that the grill is biodegradable after use. To make the grill fireproof and thus ensure that the grill does not burn during use the plant material is mixed with earthy ingredients such as minerals or stone dust. However, this type of grill is expensive and due to the minerals mixed into the plant material it still takes a relatively long time for the grill to decompose.

BRIEF SUMMARY

A more cost-efficient disposable grill is provided herein which is more environmentally friendly.

More specifically, a disposable grill is provided comprising a base tray at least including a bottom part and a top opening. The disposable grill further comprises grate means including a load-carrying structure, wherein the grate means is adapted to cover at least a part of the top opening, and wherein the bottom part of the base tray and the load-carrying structure of the grate means are formed by a flammable material.

Forming both the base tray and the grate means in a flammable material is advantageous in that the disposable grill hereby will burn during or at least in continuation of its use thereby leaving just a small amount of material behind, thus reducing the disposable grills impact on nature and obviating that the used grill would have to be transported to a dustbin, a rubbish bin, a trash can, waste dump or similar facilities after use.

Furthermore, forming the base tray and the grate means in a flammable material is advantageous in that the base tray and the grate means hereby can at least aid in creating the sufficient heat needed to grill efficiently—thus, the need for a separate combustible heat source in the base tray—such as charcoal—can be avoided or at least reduced.

It should be emphasized that the term "grate means" in this context should be interpreted as any kind of grid, mesh, grille, lattice, screen or any other kind of grate suitable for placing over the heat source of a disposable grill while carrying the food to be grilled. The grate means could be formed as a number of mutually connected individual parts, as a single part, as a number of single parts or any combination thereof.

It should also be emphasized that the term "flammable material" in this context should be interpreted as a material capable of being relatively easily ignited and of burning relatively quickly so as to aid in the heat generation during use of the disposable grill and/or so that the flammable material will catch fire during normal use of the grill and ensure that the grill is substantially "self-destructive".

In an aspect of the invention, the autoignition temperature of said flammable material is between 100° C. and 650° C., preferably between 200° C. and 550° C. and most preferred between 250° C. and 500° C.

If the base tray and the grate means autoignite at too low a temperature the base tray and the grate means will catch fire to quickly and thus burn out too quickly—i.e. the cooking time (the time in which the grill has a temperature at which it can be used to grill human food) is too short. If the autoignition temperature of the base tray and the grate means is too high the base tray and the grate means might not catch fire or it will that so long to ignite and burn that the its contribution to the heat generation during the grilling process is severely reduces. Thus, the present temperature ranges provides for an advantageous relationship between function and efficiency.

It should be emphasized that the term "autoignition temperature" (also called kindling point) in this context should be interpreted as the lowest temperature at which a substance will spontaneously ignite in a normal atmosphere without an external source of ignition, such as a flame or spark. This temperature is required to supply the activation energy needed for combustion. I.e. the autoignition temperature is the lowest temperature at which a combustible substance when heated takes fire in air and continues to burn.

In an aspect of the invention, said base tray further includes one or more walls protruding upwards from said bottom part.

Providing the base tray with walls is advantageous in that the walls will ensure that charcoal or a similar combustible heat source placed in the base tray does not fall out, they will ensure that embers or the like does not fall out of the grill and damage the surrounding and the wall could aid in creating the necessary heat during a grilling process if made from a flammable material.

In an aspect of the invention, said bottom part and said one or more walls of said base tray is formed monolithic by said flammable material.

Forming the bottom part and the walls as one single piece is advantageous in that this enables that the entire base tray can be made in a single manufacturing process, hereby reducing production time and cost. Furthermore, forming the bottom part and the walls monolithic also ensures a strong and stable base tray design capable of carrying the load of the food to be grilled without collapsing even if the bottom part and/or the walls are burning.

In an aspect of the invention, said load-carrying structure of said grate means is formed monolithic by said flammable material.

Forming the grate means as one single piece is advantageous in that this enables that the entire grate means can be made in a single manufacturing process, hereby reducing production time and cost.

In an aspect of the invention, a top surface of said grate means comprises a substantially grease impermeable surface coating.

Providing the top surface of the grate means with a substantially grease impermeable surface coating is advantageous in that if the grate is allowed to absorb grease during the grilling process, the grate means will more easily catch fire and thereby reduce the quality of the grilled product and/or reduce the structural integrity of the grate means. The grease impermeable surface coating will also create a more cleaning-friendly and hygienic top surface of the grate means.

In an aspect of the invention, a bottom surface of said grate means comprises a substantially fireproof surface coating.

Providing the bottom surface of the grate means with a substantially fireproof surface coating is advantageous in that such a coating will ensure that the grate means does not catch fire during the grill process or at least postpone the combustion of the grate means until after the disposable grill has served its purpose.

In an aspect of the invention, at least a part of an outside surface of said bottom part of said base tray comprises a substantially fireproof surface coating.

Providing an outside bottom surface the base tray with a substantially fireproof surface coating is advantageous in that such a coating will ensure that the burning material of the grill does not come in direct contact with the surrounding and it will ensure that the risk of embers falling out of the grill is reduced.

In an aspect of the invention, said fireproof surface coating is made entirely from one or more natural materials.

Making the fireproof surface coating entirely from a natural material is advantageous in that the coating will not have an adverse impact on the environment.

It should be emphasized that the term "natural material" in this context should be interpreted as any product or physical matter that comes from plants, animals, or the ground. Minerals and the metals that can be extracted from them (without further modification) are also considered to belong into this category. Natural materials include material such as flint, granite, obsidian, sandstone, sand, gems, glass, clay, porcelain and soil.

In an aspect of the invention, said flammable material is substantially carbon neutral.

Forming the main element of the disposable grill from a material that is substantially carbon dioxide (CO2) neutral is advantageous in that the grill thereby is environmentally friendly, since the combustion of it will not adversely affect the environment.

It should be noted that the term "carbon neutral" is a term used to describe fuels that neither contribute to nor reduce the amount of carbon (measured in the release of carbon dioxide) into the atmosphere.

In an aspect of the invention, said one or more walls comprise grate means support means for supporting said grate means at a periphery of said base tray.

Hereby is achieved an advantageous embodiment of the invention.

In an aspect of the invention, said base tray comprises one or more support pillars protruding from said bottom part for supporting said grate means at a middle area of said base tray.

Grates are usually formed by metal since this material is relatively strong and heat resistant. So, when forming the grate from a flammable material such as wood the initial strength may not be as good as a metal grate and since the structural integrity of the flammable grate furthermore may be compromised by heat and/or its combustion it is advantageous to reduce the span of the grate means by introducing more support points or at least ensure that the span between the support points is reduced by forming at least some of them at a middle area of the base tray.

In an aspect of the invention, said disposable grill comprises spacing means arranged to create a gap between an outside surface of said bottom part of said base tray and the underlying ground.

Providing spacing means that can lift the grill off the underlying ground during the grilling process is advantageous in that it reduces the risk of the grill damaging the surrounding and it reduces the risk of the grill igniting the surroundings.

In an aspect of the invention, said base tray and/or said grate means are formed by molding.

Forming the base tray and the grate by means of molding is advantageous in that it hereby is possible to provide the elements of the grill with a complex design in a relatively inexpensive way.

In an aspect of the invention, said molding is compression molding.

Using compression molding to form the elements of the grill is advantageous in that this manufacturing process enables that the elements may be formed by a multitude of natural organic flammable materials—substantially without additional material added (such as binders, adhesive or other)—hereby making it easier and more inexpensive to manufacture the disposable grill and make it environmentally friendly.

In an aspect of the invention, said flammable material is selected from the group consisting of wood, bamboo, corncobs, coconut shell, straw, seeds, grains, corn, sugarcane, elephant grass, nutshell, leafs, plants, charcoal, paper and cardboard.

Hereby is achieved an advantageous embodiment of the invention.

In an aspect of the invention, said flammable material is organic.

Making the flammable material from organic material is advantageous in that the grill hereby becomes more environmentally friendly.

In an aspect of the invention, said base tray contains a combustible heat source arranged to grill food placed on said grate during normal use of said disposable grill, wherein said combustible heat source is made from said flammable material.

Forming the combustible heat source from the same flammable material from which the disposable grill is made is advantageous in that it reduces cost and simplifies the manufacturing process.

In an aspect of the invention, said base tray contains a combustible heat source formed integrally with said base tray.

Forming the combustible heat source integrally with the base tray is advantageous in that it simplifies the manufacturing process and provides for a more solid and simple grill.

In an aspect of the invention, said base tray and said grate means are formed as separate and individual parts.

Forming the base tray and the grate means as separate parts is advantageous in that the two hereby can be manufactured separately by individually suited methods and only subsequently be assembled to form part of the disposable grill.

BRIEF DESCRIPTION OF THE FIGURES

The invention will be described in the following with reference to the figures in which FIG. 1. illustrates a disposable grill with the grate means lifted off, as seen in perspective, FIG. 2 illustrates a cross section through a disposable grill, as seen from the front, FIG. 3 illustrates the base tray of a disposable grill, as seen from the top.

DETAILED DESCRIPTION

Figure 4:
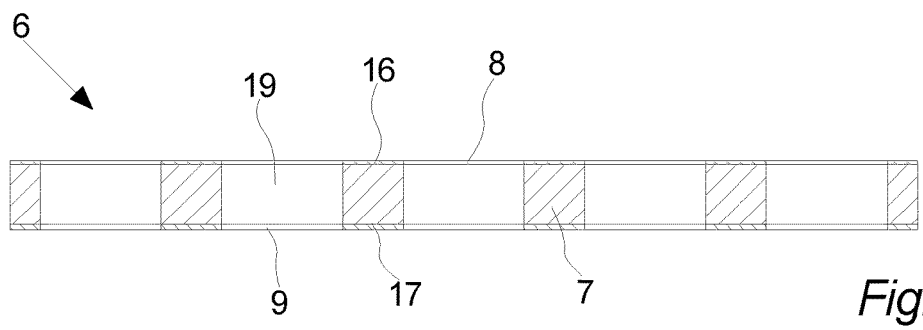
FIG. 4 illustrates a cross section through grate means, as seen from the side.

FIG. 1 illustrates a disposable grill 1 with the grate means 6 lifted off, as seen in perspective.

In this embodiment the disposable grill 1 comprises a base tray 2 and grate means 6. In this embodiment the base tray 2 comprises a substantially flat rectangular bottom part 3 but in another embodiment the bottom part 3 could be formed curved or partly curved and the shape could be round, oval, square, polygonal or another more or less complex shape.

In this embodiment the base tray 2 further comprises four walls 4 protruding upwards from the bottom part 3 to form a top opening 5. However, in another embodiment the base tray 2 could comprises another number of walls 4 such as one, two, three, five, six, eight or more or the base tray 2 could be formed completely without walls 4 e.g. if the grate means 6 was supported by four corner posts, by support pillars as disclosed in FIGS. 2 and 3 or if the grate means 6 was formed integrally with the base tray 2.

In this embodiment the entire base tray 2 is formed as one monolithic piece by compression molding. However, in another embodiment the base tray 2 could be formed monolithically by molding of a more or less liquid mass of organic material or it could be machined from a single block. In another embodiment the base tray 2 could also be formed by several separate parts e.g. assembled by means of natural resin, organic nails, dowels, wedges or the like.

Likewise, in this embodiment the grate means 6 is formed as one monolithic piece by compression molding but in another embodiment the grate means 6 could be made in a number of other ways as mention in relation with the base tray 2 in the above.

In this embodiment both the base tray 2 and the grate means 6 are made from wood chips and sawdust since this material is flammable and suited for compression molding. However, in another embodiment of the invention the base tray 2 and/or the grate means 6 could be made from a multitude of other materials e.g. dependent on the specific production method, on the autoignition temperature of the material, on the specific use and/or on how environmentally friendly the disposable grill 1 shall be.

In this embodiment the autoignition temperature of the flammable material is around 350° C. but in another could be both higher or lower although it should properly not be much higher than 350° C. to ensure that the grill 1 will burn down properly during or in continuation of use.

In this embodiment the disposable grill 1 is supplied pre-filled with a separate combustible heat source 18 which in this case is charcoal. However, in another embodiment the combustible heat source 18 could be another type of coal, it could be plant material such as wood, shells or other organic material or the combustible heat source 18 could be formed integrally with the base tray 2 during the manufacturing of the base tray 2, since the base tray 2 is made from a flammable material.

In this embodiment the bottom part 3 and the walls 4 are formed substantially solid but in another embodiment the walls 4 and/or the bottom part 3 could be provided with one or more orifices e.g. to ensure proper air supply to the combustion process in the grill 1 and/or the combustion of the grill 1 during use or for other purposes.

In this embodiment the disposable grill 1 is further provided with spacing means 14 adapted to lift the base tray 2 off the underlying ground during use of the grill. In this embodiment the spacing means 14 are formed by two separate sticks placed between the base tray 2 and the underlying ground but in another embodiment the spacing means 14 could be attached to the base tray 2 of the grill 1 or they could be formed integrally with the base tray 2 or the grate means 6.

FIG. 2 illustrates a cross section through a disposable grill 1, as seen from the front.

In this embodiment the base tray 2 is provided with grate means support means 10 at the periphery 11 of the base tray 2 for suspending the grate means 6 over the combustible heat source (not shown) in the base tray 2. In this embodiment the grate means support means 10 are formed as a simple indentation in the upper edge of the walls 4 but in another embodiment the grate means support means 10 could be formed as separate means attached to the base tray 2 or even completely separate means.

In this embodiment the base tray 2 is further provided with support pillars 12 arranged at a middle area 13 of the base tray 2. In this embodiment the support pillars 12 are formed integrally with the base tray 2 but in another embodiment the support pillars 12 could be formed as separate individual elements or the support pillars 12 could be integrated or connected to the grate means 6.

The middle area 13 is to be understood as the area away from the sides or walls 4 of the base tray 2 that forms the free bottom part 3 of the base tray 2 on which a separate combustible heat source (not shown) may be provided.

In this embodiment the outside surface 15 of the bottom part 3 of the base tray 2 comprises a substantially fireproof surface coating 9. In this embodiment the fireproof surface coating 9 covers the entire bottom surface 15 but in another the fireproof surface coating 9 would only cover a part of the bottom surface 15 and/or the fireproof surface coating 9 could also be provides on the outside surface of the walls 4 or parts of the walls 4.

In this embodiment the fireproof surface coating 9 is hardened clay but in another embodiment the fireproof surface coating 9 could be made from sand, concrete, silica, glass or any other natural material suitable for forming a fireproof surface coating 9.

Preferably the fireproof surface coating 9 is made from a natural material but in another embodiment the fireproof surface coating 9 could comprise or be made from artificial or synthetic material such as biodegradable binders, biodegradable resin, biodegradable plastic or other e.g. mixed with the natural material.

FIG. 3 illustrates the base tray 2 of a disposable grill 1, as seen from the top.

In this embodiment the base tray 2 is provided with eight evenly spaced support pillars 12 but in another embodiment the grill 1 could comprise another number of support pillars 12 such as one, two, three, four, six, ten or more and the support pillars 12 could be arranged differently.

In this embodiment all the support pillars 12 are formed with a constant uniform square cross section but in another embodiment some or all the pillars 12 could be provided with another shape such as round, oval, rectangular, polygonal or another shape and some or all the pillars 12 could be provided with a varying cross section.

FIG. 4 illustrates a cross section through grate means 6, as seen from the side.

In this embodiment the grate means 6 comprise a load-carrying structure 7 which on the entire top surface 16 is provided with a substantially grease impermeable surface coating 8 and on the entire bottom surface 17 is provided with substantially fireproof surface coating 9 but in another embodiment the grease impermeable surface coating 8 and/or the fireproof surface coating 9 would not be present or only covers a part of the respective surfaces 16, 17.

In this embodiment the substantially grease impermeable surface coating 8 is provided to ensure that grease from the grilled food is not absorbed by the load-carrying structure 7 of the grate means 6 and thus increase the risk of the grate means catching on fire or at least catching on fire too soon. However, in another embodiment the substantially grease impermeable surface coating 8, another surface coating or an additional surface coating could also ensure that the grilled food does not burn and get stuck to the grate means or the coating or coatings could ensure a more hygienic top surface.

In this embodiment the grease impermeable surface coating 8 is formed by a thin layer of silica but in another embodiment the grease impermeable surface coating 8 could be made from sand, concrete, glass or any other kind of glazing or another material suited for this purpose.

In this embodiment the fireproof surface coating 9 is hardened clay but in another embodiment the fireproof surface coating 9 could be made from sand, concrete, silica, glass or any other natural material suited for forming a fireproof surface coating 9.

Also in another embodiment the grate means 6 or at least the top surface 16 of the grate means 6 could made from a substantially grease impermeable material such as bamboo, hardwood, highly compressed natural material or the like.

Figure 5:
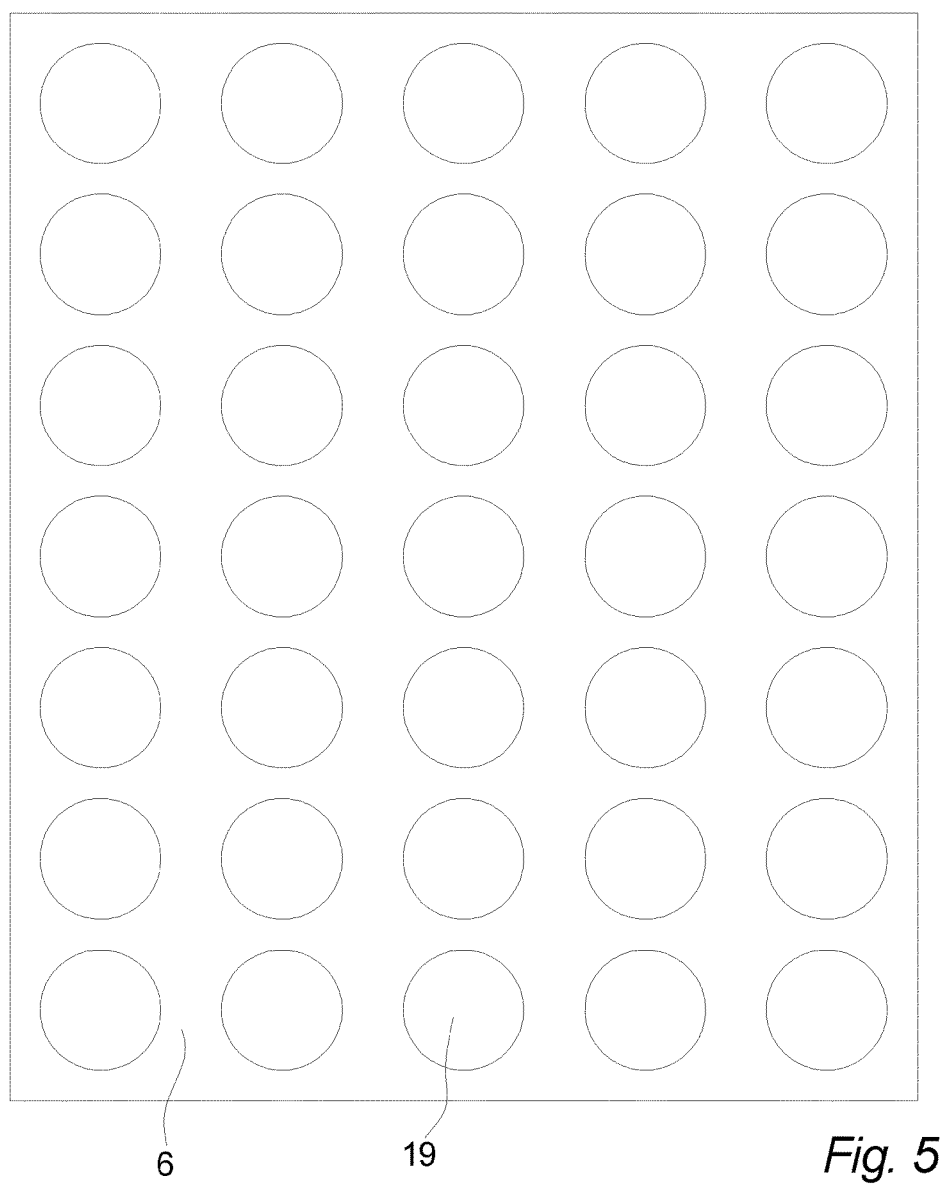
FIG. 5 illustrates grate means, as seen from the top.

FIG. 5 illustrates grate means 6, as seen from the top.

In this embodiment the grate means 6 are formed by a single plate comprising a number of evenly spaced grate orifices 19. However, in another embodiment the grate orifices 19 could be distributed differently and the grate means 6 could be formed in another way such as by means of more than one plate arranged side-by-side and/or on top of each other, by means of sticks, rods, tubes or any combination thereof.

In this embodiment the grate orifices 19 are formed as round holes, but in another embodiment some or all of the grate orifices 19 could be orifices having an elongated, a rectangular, a square, an oval, a polygonal or a more complex shape.

The invention has been exemplified above with reference to specific examples of disposable grills 1, base trays 2, grate means 6 and other. However, it should be understood that the invention is not limited to the particular examples described above but may be designed and altered in a multitude of varieties within the scope of the invention as specified in the claims.

The invention claimed is:

1. A disposable grill comprising
a base tray including a bottom part and a top opening, and
a grate comprising a load-carrying structure,
wherein said grate is adapted to cover at least a part of said top opening, and
wherein said bottom part of said base tray and said load-carrying structure of said grate are formed from a flammable material.

2. A disposable grill according to claim 1, wherein an auto-ignition temperature of said flammable material is between 100° C. and 650° C.

3. A disposable grill according to claim 1, wherein said base tray further includes one or more walls protruding upwards from said bottom part.

4. A disposable grill according to claim 3, wherein said bottom part and said one or more walls of said base tray is formed monolithic by said flammable material.

5. A disposable grill according to claim 3, wherein said one or more walls comprise a grate support for supporting said grate at a periphery of said base tray.

6. A disposable grill according to claim 1, wherein said load-carrying structure of said grate is formed monolithic by said flammable material.

7. A disposable grill according to claim 1, wherein a top surface of said grate comprises a substantially grease impermeable surface coating.

8. A disposable grill according to claim 1, wherein a bottom surface of said grate comprises a substantially fireproof surface coating.

9. A disposable grill according to claim 8, wherein said fireproof surface coating is made entirely from one or more natural materials.

10. A disposable grill according to claim 1, wherein a part of an outside surface of said bottom part of said base tray comprises a substantially fireproof surface coating.

11. A disposable grill according to claim 1, wherein said flammable material is substantially carbon neutral.

12. A disposable grill according to claim 1, wherein said base tray comprises one or more support pillars protruding from said bottom part for supporting said grate at a middle area of said base tray.

13. A disposable grill according to claim 1, wherein said disposable grill comprises a spacing arranged to create a gap between an outside surface of said bottom part of said base tray and the underlying ground.

14. A disposable grill according to claim 1, wherein said base tray and/or said grate are formed by molding.

15. A disposable grill according to claim 14, wherein said molding is compression molding.

16. A disposable grill according to claim 1, wherein said flammable material is selected from the group consisting of wood, bamboo, corncobs, coconut shell, straw, seeds, grains, corn, sugarcane, elephant grass, nutshell, leafs, plants, charcoal, paper and cardboard.

17. A disposable grill according to claim 1, wherein said flammable material is organic.

18. A disposable grill according to claim 1, wherein said base tray contains a combustible heat source arranged to grill food placed on said grate during normal use of said disposable grill, wherein said combustible heat source is made from said flammable material.

19. A disposable grill according to claim 1, wherein said base tray contains a combustible heat source formed integrally with said base tray.

20. A disposable grill according to claim 1, wherein said base tray and said grate are formed as separate and individual parts.

* * * * *